United States Patent Office 2,804,394
Patented Aug. 27, 1957

2,804,394
COMPOSITION OF MATTER

Robert L. Waide, Houston, Tex., assignor to Marvin V. Screws, Houston, Tex.

No Drawing. Application April 12, 1956,
Serial No. 577,651

2 Claims. (Cl. 106—95)

The present invention relates to a composition of matter in dry powder form which when mixed with water is adaptable for use as a permanent paint coating substance.

One of the major problems encountered in applying cementitious paint compositions of matter to surfaces is that of obtaining a permanent bond between the composition and the surface on which it is applied to eliminate cracking and peeling of the cement paint composition.

For example, heretofore when cementitious compositions have been applied to surfaces such as concrete floors, walls or ceilings, it has been necessary to prepare the surface prior to the application of the composition in order to secure a permanent bond between the paint and any type surface to which it is applied.

The present invention provides a paint which may be used as a floor topping and can be applied directly to an existing concrete or other type of floor and can be applied in a coat as smooth as polished marble and when dry becomes as hard as marble. The floor paint topping bonds permanently to the floor to which it is applied without any special preparation of the floor prior to the application of the paint. Also, the paint bonds to concrete floors, walls, or ceilings so that wear shows less on the paint than with other paints previously used. For example, where a surface such as a concrete floor has a heavy and constant use, it has heretofore been almost impossible to provide a paint which will bond to the floor so as to not require constant repainting to maintain its original appearance. The present invention appears to bond into the concrete floor so that the problem of constant repainting is greatly lessened, and in some cases altogether eliminated.

The invention also provides a cement paint that produces a weather resisting finish to any type surface and may be applied directly to the surface without prior treating thereof such as by wetting or the like. It may be applied to metal, slick tile, brick, asbestos, baked enamel, glass or any other type surface without prior treatment or preparation of the surface to receive the paint.

An object of the present invention is to provide a coating composition which permanently bonds to the surface to which it is applied without any prior treatment of the surface.

Still another object of the invention is to provide a composition of matter which may be mixed in dry powder form so that when water is added thereto a coating substance is formed that may be applied to any surface without prior treatment of the surface.

Other objects and advantages of the present invention will become more readily apparent from a consideration of the following description.

I have discovered that a composition with the foregoing desirable characteristics is obtained with a mixture consisting essentially of approximately one-eighth to three-eighths of one percent of ammonia alum, approximately three to six percent sodium chloride, approximately one-half of one percent to one percent calcium stearate, approximately nine to twelve percent of lime, approximately one to six percent magnesium silicate, approximately fifty-seven to sixty-seven percent white Portland cement, a mixture of calcium magnesium carbonate and calcium magnesium silicate in the amount of nine to fifteen percent with the last mentioned mixture consisting essentially of sixty-six percent of calcium magnesium carbonate and thirty-four percent of calcium magnesium silicate, aluminum silicate one to six percent and the balance in color as desired.

To the above constituents in powder, or dry form may be added water in the amount to obtain the desired consistency.

The magnesium silicate may be obtained from any one of several manufacturers who have large ore reserves thereof and an anlysis of a typical sample of magnesium silicate which may be used in the invention is given below:

Analysis

| | Percent |
|---|---|
| $SiO_2$ | 58.61 |
| $MgO$ | 28.88 |
| $CaO$ | 4.97 |
| $Fe_2O_3$ | .30 |
| $Al_2O_3$ | .85 |
| $Co_2$ | 1.95 |
| Ignition loss | 4.41 |

Bulking value of 4.2 gallons for each 100 pounds.

The mixture of calcium magnesium carbonate and calcium magnesium silicate is obtained from a crystal rock found in unlimited quantities in the State of Wisconsin. A typical analysis of the rock which may be used in practicing the invention is as follows:

Chemical analysis

| | Percent |
|---|---|
| Acid soluble calcium as oxide | 22.22 |
| Acid soluble magnesium as oxide | 14.1 |
| Carbon dioxide | 29.35 |
| Acid insoluble calcium as oxide | 6.7 |
| Acid insoluble magnesium as oxide | 6.6 |
| Silica | 20.9 |
| Moisture | .1 |
| | 99.97 |

Calculating from this data the probable state in which the elements exist, we have:

| | Percent |
|---|---|
| Calcium magnesium carbonate | 65.7 |
| Calcium magnesium silicate | 34.2 |
| Moisture | .1 |
| | 100.0 |

Bulking ratio—.04212 gallons per pound
Oil absorption—16 cc. per 100 grams
Specific gravity—2.85

| | Percent |
|---|---|
| Silica ($SiO_2$) | 45.42 |
| Aluminum ($Al_2O_3$) | 38.79 |
| Loss on ignition | 13.79 |
| Titanium ($TiO_2$) | 1.59 |
| Calcium ($CaO$) | 0.35 |
| Iron ($Fe_2O_3$) | 0.31 |
| Sodium ($Na_2O$) | 0.13 |
| Potassium ($K_2O$) | 0.02 |

| | |
|---|---|
| Coating—Particle size average (microns), number | 4.8 |
| Oil absorption (ASTM D281–31) | 33 |
| Moisture maximum percent | 1.0 |

Bulking value:
- Pounds per gallon _____ 21.5
- Gallons per pound _____ 0.0466 pH _____ 4.4–4.8
Color (brightness) percent _____ 80.5–83
Specific gravity _____ 2.58
Residue 325 mesh maximum percent _____ 0.15

Particle size distribution percent by weight:
- 0–½ micron _____ 4
- ½–1 micron _____ 6
- 1–2 microns _____ 10
- 2–5 microns _____ 31
- 5–10 microns _____ 30
- 10–35 microns _____ 19

Color in powder form may be added to the mixture to obtain the desired shade of paint when the powder mixture is mixed with water.

I have found that the preferred mixture consists essentially of:

One-quarter of one percent of alum, one percent calcium stearate, three percent aluminum silicate, sodium chloride six percent, three percent of magnesium silicate, twelve percent of a mixture of calcium magnesium carbonate and calcium magnesium silicate with the calcium magnesium carbonate comprising approximately sixty-six percent and the calcium magnesium silicate approximately thirty-four percent of the last mentioned mixture, lime in the amount of twelve percent, cement in the amount of sixty-two percent and the color as desired.

However, the paint composition may vary within the percentages given previously without departing from the desirable characteristics obtained from the paint composition.

I am unable to precisely define the various chemical reactions and changes in the composition which occur when water is mixed therewith. However, I do know that a paint composition is obtained by means of the present invention which easily and permanently bonds to any surface. Also, a paint composition is obtained which may be applied to concrete floors and because of the bond formed between the paint and floor, the floor will retain the painted appearance over a much greater length of time than heretofore thought possible.

By way of explanation, it would appear that the lime and alum reacts with the mixture of calcium magnesium carbonate and calcium magnesium silicate to retain the moisture within the product and also produces hardness. The magnesium silicate and aluminum silicate in co-operation with the mixture of calcium magnesium carbonate and calcium magnesium silicate apparently produces an adhesive that causes the composition to adhere to any surface such as old concrete floors or other types of surfaces such as glass, metal, asbestos, tile, baked enamel, etc., without the necessity of treating the surface prior to the application of the invention. It is generally customary with cement coating compositions now in use to treat the surface to which it is applied prior to applying the coating substance. In some cases, this treatment has been effected by applying special bonding agents to the surface to be coated. In other cases, it is necessary to wet the surface with water before applying the paint in order to insure bonding of the paint to the surface.

The present invention provides a composition which when mixed with water and cement may be applied directly to the surface and will bond therewith without any prior treatment of the surface.

The percentages given herein are on weight basis unless otherwise noted.

Broadly the invention relates to a composition of matter which is suitable for use as a coating substance, as a floor topping, wall plaster or paint.

The paint may be applied with a brush, or if desired, less water may be added thereto to form a paste whereby the paint may be troweled on, if desired.

What is claimed is:

1. A composition of matter which when mixed with water bonds to any surface upon drying consisting essentially of, approximately one-eighth to three-eighths of one percent of ammonia alum, approximately three to six percent sodium chloride, approximately one-half of one percent to one percent calcium stearate, approximately nine to twelve percent of lime, approximately one to six percent magnesium silicate, approximately fifty-seven to sixty-seven percent white Portland cement, a mixture of calcium magnesium carbonate and calcium magnesium silicate in the amount of nine to fifteen percent with the last mentioned mixture consisting essentially of sixty-six percent of calcium magnesium carbonate and thirty-four percent of calcium magnesium silicate, aluminum silicate one to six percent and the balance in color as desired.

2. A composition of matter which when mixed with water bonds to any surface without prior treatment of the surface consisting essentially of, one-quarter of one percent of alum, one percent calcium stearate, three percent aluminum silicate, sodium chloride six percent, three percent of magnesium silicate, twelve percent of a mixture of calcium magnesium carbonate and calcium magnesium silicate with the calcium magnesium carbonate comprising approximately sixty-six percent and the calcium magnesium silicate approximately thirty-four percent of the last mentioned mixture, lime in the amount of twelve percent, cement in the amount of sixty-two percent and the color as desired.

References Cited in the file of this patent

UNITED STATES PATENTS

| | | |
|---|---|---|
| 927,312 | Anderson | July 6, 1909 |
| 1,782,748 | Smith | Nov. 25, 1930 |
| 2,588,438 | Waide | Mar. 11, 1952 |
| 2,611,713 | Glick | Sept. 23, 1952 |